2,907,601
FRAMELESS SPORTSMAN'S AND UTILITY TRAILERS

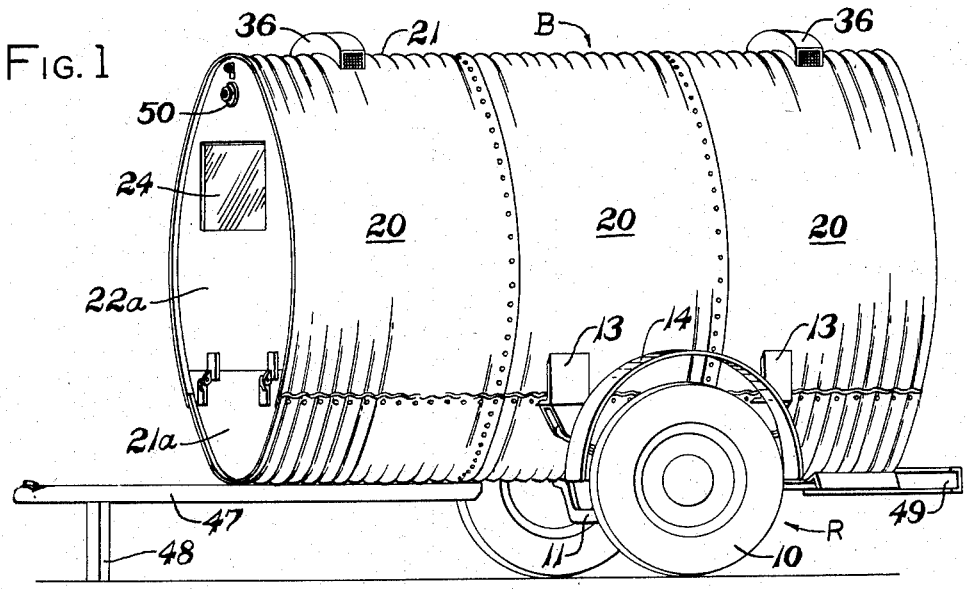
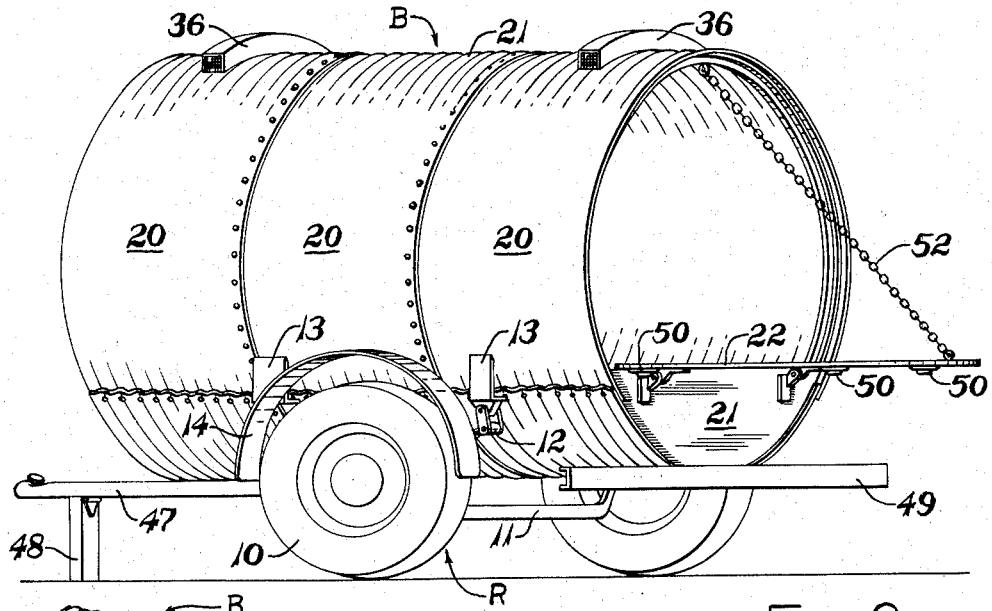
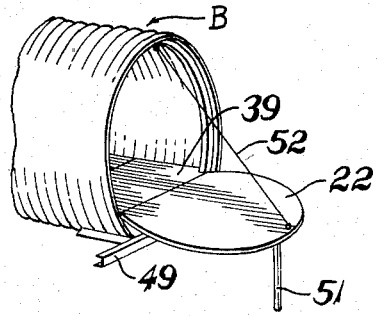

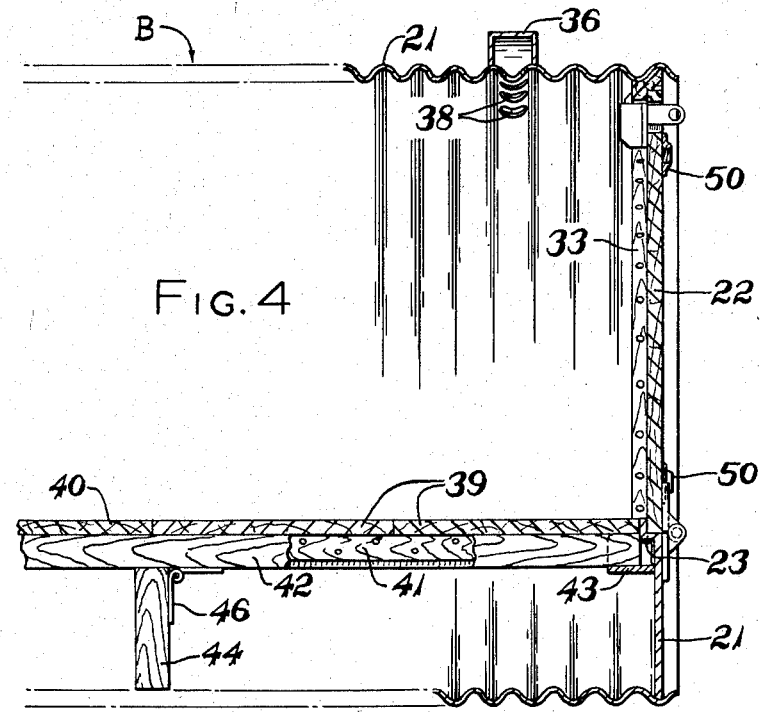
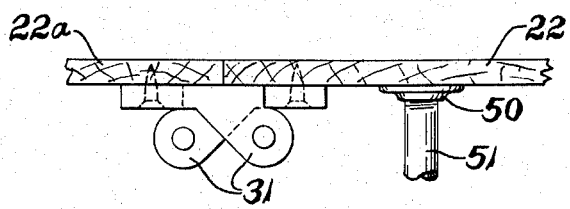
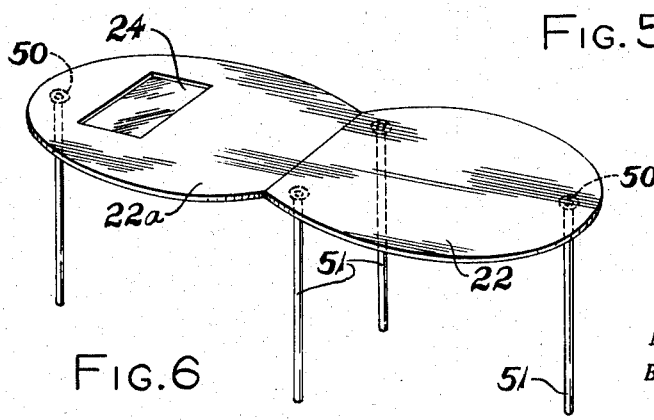
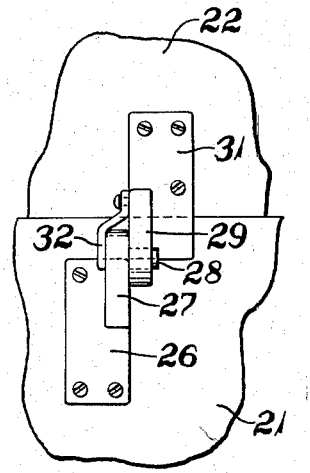

Harold R. Kuchenbecker and Otto H. Arent, Hudson, Ohio

Application April 30, 1956, Serial No. 581,480

5 Claims. (Cl. 296—23)

This invention relates to trailers primarily intended for use by sportsmen for camping, hunting, and fishing, but is also useful for farmers, home owners and others for general utility operation, including use by the armed forces for utility transport, soup kitchens, portable barracks. Also the vehicles can be formed to be stored on end, filled from the top, transported on a bed trailer, and individually hauled away at the destination.

An important feature of this invention is that the trailer is frameless, that is, the body proper forms the frame, yet the strength and structural rigidity of the trailer of this invention exceeds that of the usual frame and body construction.

These advantages of strength and rigidity arise from forming the combined frame and body of a large cylindrical steel member, which in the preferred form of the invention, is made of a suitable length of corrugated steel culvert.

A trailer of this construction can be made exceedingly strong, can be readily assembled with conventional running gear, offers little obstruction when being drawn through heavy cover, can be made to float upright in the water in case of emergency, and has other advantages and features inherent in the design that can be best described in connection with the following detailed description of a preferred embodiment of the invention, taken with the accompanying drawings.

Fig. 1 is a perspective view of the trailer taken from the side.

Fig. 2 is a rear quarter perspective view.

Fig. 3 is a fragmentary rear quarter perspective view.

Fig. 4 is a partial longitudinal section of the body.

Fig. 5 is a hinge detail.

Fig. 6 shows the double table set up, and

Fig. 7 shows how the front table section is partially supported by the rear section.

Referring to the drawings, the trailer of the invention has a tubular body B supported by running gear R of conventional construction comprising wheels and tires 10, axle 11, and springs 12 fitted to brackets 13 that are welded or bolted to the body B. Fenders 14 are supported by spring brackets 13.

The nature of body B forms the backbone of the design in that it makes possible great strength, simple construction, and combination features characteristic of this invention in sporting, utility, and farm use. Body B, as formed in the original full scale model is formed of sheet steel culvert. This structure is formed by simultaneously rolling and corrugating strips of sheet steel 20 into circular form, and riveting or welding the resultant cylinders together to form a tube of the desired length.

The corrugations 21 peculiarly facilitate construction because they interfit end to end, the result being a trailer body that is exceedingly strong and rigid per unit weight, and yet is formed from material readily available as an article of commerce. As seen in Fig. 4 the corrugations have hills and dales so that a longitudinal section through the body structure resembles a sine curve.

A typical size culvert body for the uses referred to could be one based on an assembled culvert section 5 ft. in diameter and 8 ft. long, and is formed of 11 gauge galvanized sheet steel.

The end panels, front and rear, are virtually identical and are arranged to permit use with a floor or without one. As seen in Figs. 1–4, the end panels are divided into lower, relatively small segments or panels 21 and 21a, and upper major section segments or panels 22 and 22a. The lower panels are formed of sheet steel plates of suitable shape, welded to the body B, and flanged as at 23, Fig. 4, there being little difference between the front and rear construction except in details and fittings and the fact that a window 24 is shown fitted to the front panel 22a, whereas in the drawings the rear panel 22 carries no such window.

The upper panels are formed of plywood or other light, strong material and the upper panel is hinged to the lower one. As seen in Fig. 5, lower hinge part 26 has an ear or flange 27 from which projects a pin 28 that fits into ear 29 on the upper hinge part 31. A pivoted latch 32 prevents accidental dislodgement when the panel is open, but the hinges at each side are arranged as in Fig. 5 so that when the latch 32 (which may be fitted to one or both hinges) is lifted free, the upper panel can be slid laterally and freed from the lower panel.

The upper panels close against rabbeted oak jambs 33 riveted to the body B and a suitable latch 34 that can be locked and unlocked from the outside is provided, details of which are not claimed.

Arcuate ventilator shrouds 36 are attached to the body at front and rear, and are screened at each end as at 37 for insect exclusion, but provide ventilation through holes 38 (Fig. 4) in the body B.

For camping and similar uses a removable floor is provided. The floor is made up of two narrow panels 39 at the rear and a longer panel 40 at the front. The panels are supported by oak side rails 41 and may have additional center support by a ridge bar 42, removably supported at each end in U-shaped brackets 43 welded to the lower panels. A central column member 44 is hinged to the bar 42 for additional support, the hinge 46 providing reduced bulk for stowage.

The body B is fitted with the usual draw bar 47 and stand 48, these forming no part of the invention. A bumper 49 is fitted to the rear in any suitable manner and stop lights and electrical connections (not shown) may be added in as desired, such details being conventional.

A feature of the trailer of this invention is that the upper panels 22 and 22a are mobile and can form tables for camping and other purposes. Rear panel 22 carries three pipe flanges 50, and pipes 51 may be threaded into the flanges. Also, a chain 52 is provided to support the rear panel independently of pipes 51.

For example, as seen in Fig. 2, rear panel 22 is supported only by chain 52, as would be usual where the panel is merely opened for access to the trailer body. However, if additional strength and rigidity of support is required, or if the panel is to be used as a table, one pipe leg 51 can be threaded into the uppermost flange 50, as seen in Fig. 3.

Also, as seen in Figs. 6 and 7, rear panel 22 may be removed from the trailer body, and all three pipe flanges 50 of rear panel 22 fitted with pipe legs 51, making this panel a self supporting table independent of the trailer body. Front panel 22b can also be removed and fitted with its single pipe leg 51, whereupon the straight edges are brought together, the hinge parts 31 of the rear panel 22 supporting the adjacent edge of front panel 22b.

Removability of the upper panels facilitates utility hauling of lumber and long or protruding objects.

The easily accessible and removable rear floor panels 39 provide for utilization of the under-floor space for stowage of gear on camping and similar trips.

Removal of the entire floor provides for hauling loose material such as grain, sand or gravel or even liquids which in case the lower panels are attached to the body by watertight welding. Such construction also renders the trailer floatable, stabilized by the running gear. Removal of one or both upper panels and the floor converts the trailer into a cattle feeder or even a mobile water station.

If window or windows 24 can be opened, grain can be temporarily stored in these trailers, or they can be filled in the field and left to stand or carted to desired parts without danger of loss. They may also be stood on their rear end and filled from the front end as a storage bin.

Pigs and other live stock can be hauled by the farmer by removing the rear panel 22 for entry and then closing it, thus giving weather protection, the exceedingly strong nature of the body defying damage. If the ends are sufficiently strong, being tubular the bodies can be fitted with the wheels and axles, and dropped into the water or on to land from a reasonably low height, for field military use.

Thus it can be seen that the trailer of the invention is one of a multitude of varied type uses, is strong, and is readily constructed from available materials most of which are conventional in design or which can be quickly fabricated from supplies of sheet metal, plywood, and the like.

Having completed a detailed description of a preferred embodiment of our invention so that those skilled in the art may practice same, we claim:

1. A trailer vehicle for utility use said trailer vehicle having a combined, unitary, frame and tubular body structure, end closures for said combined frame and unitary tubular body structure, and running and towing gear for supporting and towing said combined frame and unitary tubular body structure, said unitary frame and body structure being formed of corrugated tubular sheet metal, said end closures each comprising a fixed, lower minor segment of a circle, and an upper hinged major segment, one of said major end segments being removable, and at least three table leg sockets being fitted to said one major end segment.

2. The vehicle of claim 1, wherein side rails extend along said tubular body between said minor segments, and a floor is supported on said side rails with at least the rear part of said floor being removable.

3. The vehicle of claim 1, wherein the other major end segment is also removable, and at least one table leg socket being mounted on said other segment away from the chord thereof, and means projecting past the chord of said one major end segment for supporting the chord portion of said other major end segment.

4. A trailer vehicle having a combined unitary frame and tubular body structure, said body structure comprising a plurality of sections of uniformly circumferentially corrugated sheet metal, said sections being joined by axially overlapping and interfitting one or more corrugations, and running and towing gear mounted directly on said body structure, end closures for said body structure at least one of said closures comprising a fixed, lower, minor segment of a circle and a removable, upper, major segment of a circle that extends to the periphery of the body structure, and means to attach said removable major segment to said body.

5. A trailer vehicle having a combined unitary frame and tubular body structure, said body structure comprising a plurality of sections of uniform circumferentially corrugated sheet metal, said sections being joined by axially overlapping and interfitting one or more corrugations, and running and towing gear mounted directly on said body structure, end closures for said body structure at least one of said closures comprising a fixed, lower, minor segment of a circle and a removable, upper, major segment of a circle, means to attach said removable major segment to said body, a side rail extending axially along each side of tubular body at the junction of said major and minor segments, a floor supported on said side rails, at least one section of said floor being removable to give access to the lower part of said body for storage.

References Cited in the file of this patent

UNITED STATES PATENTS

| | | |
|---|---|---|
| 731,689 | Klocksiem | June 23, 1903 |
| 1,320,554 | Houser | Nov. 4, 1919 |
| 2,211,239 | Liston | Aug. 13, 1940 |
| 2,563,372 | Risse | Aug. 7, 1951 |
| 2,686,060 | Couse | Aug. 10, 1954 |
| 2,746,578 | Bromeley | May 22, 1956 |